(12) United States Patent
Kawashima

(10) Patent No.: US 10,766,462 B2
(45) Date of Patent: Sep. 8, 2020

(54) WINDSHIELD WIPER CONNECTOR

(71) Applicant: Pylon Manufacturing Corporation, Deerfield Beach, FL (US)

(72) Inventor: Hiroshi Kawashima, Sunrise, FL (US)

( * ) Notice: Subject to any disclaimer, the term of this patent is extended or adjusted under 35 U.S.C. 154(b) by 369 days.

(21) Appl. No.: 15/600,218

(22) Filed: May 19, 2017

(65) Prior Publication Data

US 2017/0334406 A1 Nov. 23, 2017

Related U.S. Application Data

(60) Provisional application No. 62/338,842, filed on May 19, 2016.

(51) Int. Cl.
*B60S 1/40* (2006.01)
*B60S 1/38* (2006.01)

(52) U.S. Cl.
CPC ........... *B60S 1/4074* (2013.01); *B60S 1/3851* (2013.01); *B60S 1/407* (2013.01); *B60S 1/4077* (2013.01); *B60S 2001/408* (2013.01)

(58) Field of Classification Search
CPC ...... B60S 1/4067; B60S 1/407; B60S 1/4074; B60S 1/4077; B60S 2001/408; B60S 1/4003
See application file for complete search history.

(56) References Cited

U.S. PATENT DOCUMENTS

| | | |
|---|---|---|
| D56,762 S | 12/1920 | Minier |
| 2,310,751 A | 2/1943 | Scinta |
| 2,539,219 A * | 1/1951 | Abdelnour ............ B60S 1/4003 403/190 |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |

(Continued)

FOREIGN PATENT DOCUMENTS

| | | |
|---|---|---|
| BR | 102015007588 A2 | 4/2016 |
| DE | 10230457 A1 | 1/2004 |

(Continued)

OTHER PUBLICATIONS

Machine translation of description portion of German publication 102008042516, published May 2009. (Year: 2009).*

(Continued)

*Primary Examiner* — Gary K. Graham
(74) *Attorney, Agent, or Firm* — The Brickell IP Group, PLLC; Javier Sobrado; A. Robert Weaver

(57) ABSTRACT

A connector for a windshield wiper, and a wiper blade assembly including same, that accommodates multiple pin-type windshield wiper arms having varying pin lengths and locking mechanisms. The connector for connecting a windshield wiper assembly to a wiper arm may have a peripheral wall having at least two opposing peripheral side walls and a top surface extending from one of the two opposing peripheral side walls to the other. The opposing peripheral side walls may each have one or more retaining pin apertures aligned with one another and sized to be capable of slideably accepting a retaining pin of at least one pin-type and/or pin-plus-locking-arm windshield wiper arm.

21 Claims, 12 Drawing Sheets

(56) References Cited

U.S. PATENT DOCUMENTS

| | | |
|---|---|---|
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynn |
| 3,192,551 A | 7/1965 | Appel |
| 3,234,578 A | 2/1966 | Goulb et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |

(56) References Cited

U.S. PATENT DOCUMENTS

| | | |
|---|---|---|
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |

(56) References Cited

U.S. PATENT DOCUMENTS

| | | |
|---|---|---|
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| 6,766,906 B2 | 6/2004 | Charng |
| D490,763 S | 8/2004 | Leu |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B1 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |

(56) References Cited

U.S. PATENT DOCUMENTS

| | | |
|---|---|---|
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |

(56) References Cited

U.S. PATENT DOCUMENTS

| | | |
|---|---|---|
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| D765,501 S | 9/2016 | Peers et al. |

(56) References Cited

U.S. PATENT DOCUMENTS

| | | |
|---|---|---|
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0074037 A1* | 4/2004 | Op't Roodt ............... B60S 1/40 15/250.32 |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1* | 6/2006 | Coughlin ................ B60S 1/40 15/250.32 |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0197047 A1 | 8/2009 | Teranishi |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0066857 A1 | 3/2012 | Webert |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentino et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1* | 7/2013 | Tolentino ................ B60S 1/407 15/250.32 |
| 2013/0185890 A1 | 7/2013 | Ku |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0212825 A1* | 8/2013 | Lee ....................... B60S 1/3867 15/250.32 |
| 2013/0212828 A1 | 8/2013 | Coughlin |
| 2013/0219649 A1 | 8/2013 | Tolentinto et al. |
| 2013/0227809 A1 | 9/2013 | Tolentinto et al. |

(56) References Cited

U.S. PATENT DOCUMENTS

| | | |
|---|---|---|
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0082876 A1* | 3/2014 | Avasiloaie ............ B60S 1/381 15/250.32 |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0215747 A1* | 8/2014 | Yang .................... B60S 1/4003 15/250.32 |
| 2014/0230175 A1* | 8/2014 | Kim ....................... B60S 1/387 15/250.32 |
| 2014/0259504 A1 | 9/2014 | Piotrowski et al. |
| 2014/0259505 A1 | 9/2014 | Fournier et al. |
| 2014/0283525 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0121644 A1 | 5/2015 | Young, III et al. |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentino et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |
| 2017/0136998 A1* | 5/2017 | Mouleyre ............ B60S 1/4003 |
| 2017/0334400 A1 | 11/2017 | Kawashima |
| 2017/0334404 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | | |
|---|---|---|---|
| DE | 4224866 | B4 | 1/2007 |
| DE | 102008042416 | * | 5/2009 |
| EP | 2781416 | A1 | 9/2014 |
| WO | 2017/201458 | A1 | 11/2017 |
| WO | 2017/201464 | A1 | 11/2017 |
| WO | 2017/201470 | A1 | 11/2017 |
| WO | 2017/201473 | A1 | 11/2017 |
| WO | 2017/201485 | A1 | 11/2017 |

OTHER PUBLICATIONS

Naedele, M.,"An Access Control Protocol for Embedded Devices," Industrial Informatics, 2006 IEEE International Conference on IEEE, PI, dated Aug. 1, 2006, Retrieved from the Internet URL: http://ieeexplore.ieee.org/document/4053450/, pp. 565-569.

"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.

"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.

Final Rejection towards U.S. Appl. No. 13/679,646 dated Jul. 14, 2017.

Office Action issued in connection with EP Application No. 12171721.9 dated Aug. 16, 2017.

Non-Final Rejection towards U.S. Appl. No. 14/715,144 dated Nov. 15, 2017.

International Search Report and Written Opinion issued in PCT Application No. PCT/US2017/033622 dated Aug. 11, 2017.

International Search Report and Written Opinion issued in PCT Application No. PCT/US2017/033629 dated Aug. 22, 2017.

International Search Report and Written Opinion issued in PCT Application No. PCT/US2017/033640 dated Aug. 23, 2017.

International Search Report and Written Opinion issued in PCT Application No. PCT/US2017/033657 dated Sep. 28, 2017.

International Search Report and Written Opinion issued in PCT Application No. PCT/US2017/033643 dated Oct. 2, 2017.

Forch, R., et al., "Appendix C: Contact Angle Goniometry," Surface Design: Applications in Bioscience and Nanotechnology, pp. 471-473 (Sep. 9, 2009).

International Search Report and Written Opinion issued in PCT Application No. PCT/US2017/059275 dated Jan. 25, 2018.

\* cited by examiner

WINDSHIELD WIPER CONNECTOR

CROSS REFERENCE TO RELATED APPLICATIONS

This application claims the benefit of U.S. Provisional Application No. 62/338,842 filed May 19, 2016, the disclosure of which is hereby incorporated herein by reference in its entirety.

TECHNICAL FIELD

This invention relates in general to windshield wipers, and more particularly, to an improved connector for a windshield wiper that allows the windshield wiper to be attached to multiple pin-type windshield wiper arm configurations. The invention is also directed to windshield wipers incorporating these novel connectors.

BACKGROUND OF THE INVENTION

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture More recent side pin arms are described in U.S. Pat. No. 6,553,607. These side pin arms do not have the reduced radius groove found in traditional pin arms (which was used to lock the pin in place), in favor of a constant-radius pin. Such arms use a locking mechanism with a locking tab that is designed to extend from one side of the wiper blade to the other and secure the arm in place laterally, while the pin secures the wiper blade from longitudinal movement. These wiper arms (sometimes referred to herein as "pin-plus-locking-arm") are generally provided on vehicles with a specially designed wiper blade that is designed to connect only to that specific type of arm. Thus, when the wiper blade must be replaced, the replacement must generally be done at a car dealership and requires the purchase of an expensive replacement part. Moreover, there are several versions of these pin-plus-locking-arm wiper arms, some of which have varying lengths, locking arms or spacers. Accordingly, an aftermarket provider that offers windshield wipers that are not directed to a specific car must evaluate whether to add a separate connector to accommodate each particular pin-plus-locking-arm wiper arms (in addition to the connectors that accommodate the various size hook arms, traditional pin arms, etc.), This leaves consumers with vehicles having the new pin-plus-locking arm wiper arms with fewer, usually more expensive, alternatives for replacement windshield wipers.

Thus, there is a need for inexpensive connectors that are capable of securing a windshield wiper blade to a variety of arms, including pin-plus-locking-arm wiper arms. In particular, it would be desirable to have a connector that can be attached to a wiper blade that will allow the wiper blade to be locked to a wide variety of these pin-type wiper arms despite their various locking arm mechanisms. It would also be desirable to have a windshield wiper connector that can be fabricated or molded as a single piece at low-cost, and that can accommodate a wide variety of these pin-type and pin-plus-locking-arm wiper arms. The disclosed concepts provide a low-cost windshield wiper connector capable of attachment to a wide variety of the aforementioned windshield wiper arms for the purpose of reducing the amounts of inventory parts required to supply a vehicle market that uses a wide variety of pin-type and pin-plus-locking-arm windshield wiper arm types.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

This disclosure is generally directed to novel connectors for windshield wiper blades. More particularly, the disclosure relates, in part, to a single piece windshield wiper connector that can accommodate multiple pin-type and pin-plus-locking-arm windshield wiper arms having varying pin lengths and locking mechanisms.

In certain embodiments, a connector may include a peripheral wall having at least two opposing peripheral side walls, each having an outer surface, where the side walls may each have at least one retaining pin aperture aligned with one another and sized to be capable of slidably accepting a retaining pin of at least one pin-type windshield wiper arm. The connector may further have a top surface extending from one of the two opposing peripheral side walls to the other; and at least one aperture in the top surface sized such that the aperture is capable of accepting a first locking tab that extends from a locking arm on a first pin-type wiper arm of the at least one pin-type windshield wiper arm, when the first pin-type wiper arm is connected to the connector.

In certain embodiments, a connector may include a peripheral wall having at least two opposing peripheral side walls, each having an outer surface, a top surface extending from one of the two opposing peripheral side walls to the other comprising a proximal shelf and a distal shelf; and at least one aperture in the proximal shelf sized and positioned to be capable of receiving a locking tab of a locking arm of a first pin-type windshield wiper arm when the connector is locked to the windshield wiper arm such that the connector may be prevented from sliding off of the windshield wiper arm. The opposing peripheral side walls may each have at least one retaining pin aperture aligned with one another and sized to be capable of slidably accepting a retaining pin of at least one pin-type windshield wiper arm.

In certain embodiments, a wiper blade assembly may include a wiper strip, a force distribution structure, and a connector capable of connecting wiper blade assembly to at least two different pin-type wiper arms wherein each of the at least two different pin-type wiper arms has a locking arm. The connector may include a peripheral wall having at least two opposing peripheral side walls, each having an outer surface, a top surface extending from one of the two opposing peripheral side walls to the other. The top surface may include a proximal shelf and a distal shelf, at least one aperture in the proximal shelf, and at least one aperture in the distal shelf. The connector may further include a tower located between the proximal shelf and the distal shelf. The opposing peripheral side walls may each have at least one retaining pin aperture aligned with one another and sized to be capable of slidably accepting a retaining pin of at least one pin-type windshield wiper arm.

DETAILED DESCRIPTION OF THE PREFERRED EMBODIMENT

Figure 1:
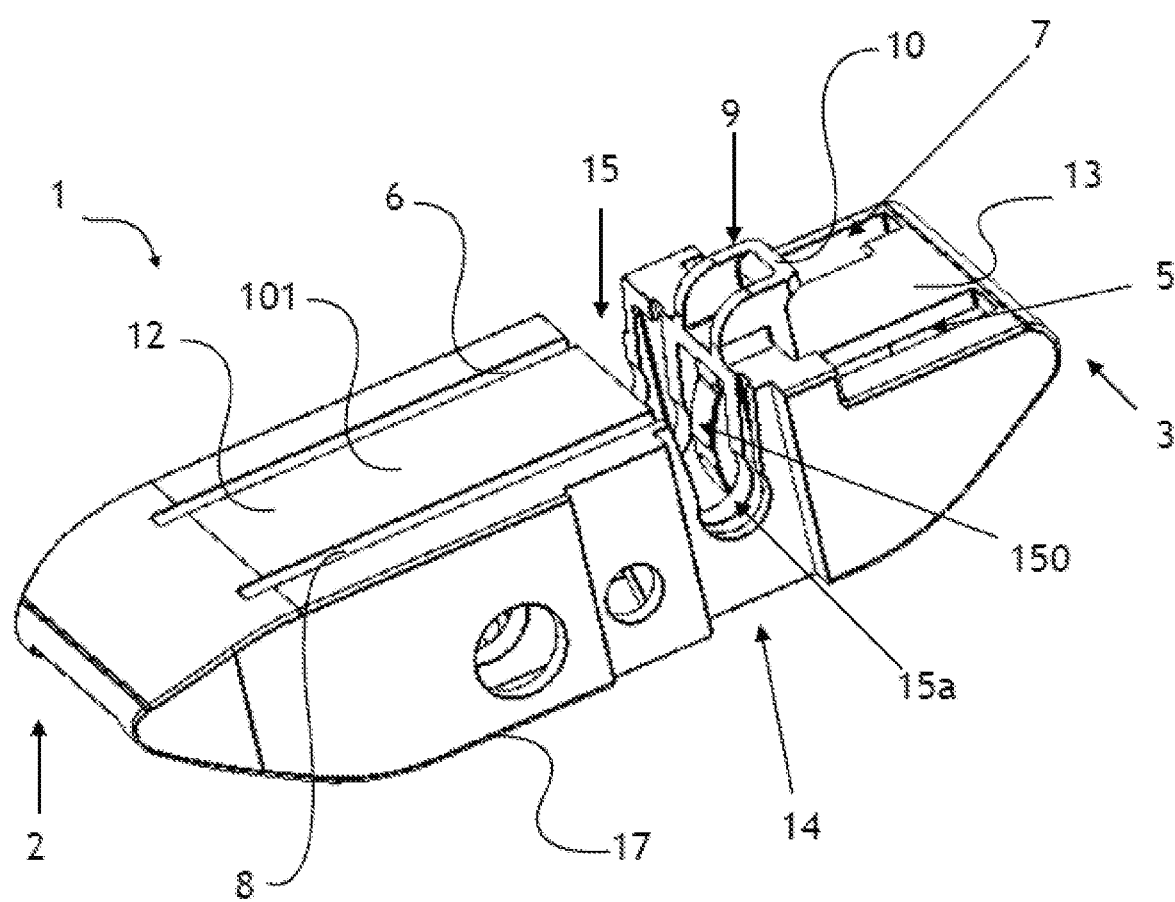
FIG. 1 illustrates a top perspective view of an embodiment of a connector of the disclosure.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In one aspect, the invention is generally directed to a connector for a windshield wiper (or a windshield wiper incorporating same) that allows one windshield wiper to be secured to multiple types of windshield wiper arms, each having a different configuration. In this aspect, the connector may be designed for use with multiple different windshield wiper arms that use transverse retaining pins and/or locking arms that secure the windshield wiper to the windshield wiper arm.

In certain embodiments, a connector may include a peripheral wall having at least two opposing peripheral side walls, each having an outer surface, where the side walls may each have at least one retaining pin aperture aligned with one another and sized to be capable of slidably accepting a retaining pin of at least one pin-type windshield wiper arm. The connector may further have a top surface extending from one of the two opposing peripheral side walls to the other; and at least one aperture in the top surface sized such that the aperture is capable of accepting a first locking tab that extends from a locking arm on a first pin-type wiper arm of the at least one pin-type windshield wiper arm, when the first pin-type wiper arm is connected to the connector.

In certain embodiments, the distance between the outside surfaces of the peripheral side is sized such that connector is capable of being attached to a second pin-type windshield wiper arm, such that a locking arm of the second pin-type windshield wiper arm extends past the at least two opposing peripheral side walls of the connector and a locking tab of the second pin-type wiper arm extends along the outer surface of one of the at least two opposing peripheral side walls of the connector. In certain embodiments, the top surface of the connector may further have a proximal shelf and a distal shelf such that the connector is capable of having the bottom side of the first and/or second locking arms of the first and/or second pin-type windshield wiper arms rest on the proximal shelf when the connector is locked to each of the first pin-type and second pin-type windshield wiper arms. In certain embodiments, the proximal shelf of the connector is recessed relative to the distal shelf.

In certain embodiments, the connector may have at least two internal support walls extending downward from the top surface and substantially along the longitudinal length of the connector. In certain embodiments, at least one rivet passage and arcuate rivet clip in each of the internal support walls capable of accepting and securing a rivet of a wiper blade, and securing the connector to the wiper blade. In certain embodiments, at least one rivet aperture may be disposed in each of the at least two opposing peripheral side walls that is capable of accepting a rivet of a mounting base of a wiper blade in order to secure the connector the wiper blade assembly. The rivet apertures may be in alignment with the rivet passages and rivet clips in the internal support walls.

In certain embodiments, the connector is capable of connecting to the at least one pin-type wiper arm such that a bottom side of a locking arm of the at least one pin-type windshield wiper arm rests on the proximal shelf when the connector is locked to the at least one pin-type windshield wiper arm. In certain embodiments, the connector is capable of connecting to the at least one pin-type wiper arm such that a bottom side of a locking arm of the at least one pin-type windshield wiper arm rests on the distal shelf when the connector is locked to the at least one pin-type windshield wiper arm. In certain embodiments, the distal shelf may be sloped.

In certain embodiments, the connector may include a tower which assists in securing the locking arm of the at least one pin-type windshield wiper. In certain embodiments, the tower may have an extension to assist in securing the locking arm of the at least one pin-type windshield wiper. In certain embodiments, the tower may include a strengthening rib. In certain embodiments, the connector may include a tower which assists in securing the locking arm of the at least one pin-type windshield wiper, wherein longitudinal ribs may be provided on the distal shelf adjacent the tower.

In certain embodiments, the connector may include a spacer cavity in the peripheral side wall sized to be capable of accepting a spacer of a pin-type wiper arm having a spacer.

In certain embodiments, a connector may include a peripheral wall having at least two opposing peripheral side walls, each having an outer surface, a top surface extending from one of the two opposing peripheral side walls to the other comprising a proximal shelf and a distal shelf; and at least one aperture in the proximal shelf sized and positioned to be capable of receiving a locking tab of a locking arm of a first pin-type windshield wiper arm when the connector is locked to the windshield wiper arm such that the connector may be prevented from sliding off of the windshield wiper arm. The opposing peripheral side walls may each have at least one retaining pin aperture aligned with one another and sized to be capable of slidably accepting a retaining pin of at least one pin-type windshield wiper arm.

In certain embodiments, a wiper blade assembly may include a wiper strip, a force distribution structure, and a connector capable of connecting wiper blade assembly to at least two different pin-type wiper arms wherein each of the at least two different pin-type wiper arms has a locking arm. The connector may include a peripheral wall having at least two opposing peripheral side walls, each having an outer surface, a top surface extending from one of the two opposing peripheral side walls to the other. The top surface may include a proximal shelf and a distal shelf, at least one aperture in the proximal shelf, and at least one aperture in the distal shelf. The connector may further include a tower located between the proximal shelf and the distal shelf. The opposing peripheral side walls may each have at least one retaining pin aperture aligned with one another and sized to be capable of slidably accepting a retaining pin of at least one pin-type windshield wiper arm.

In certain embodiments, the at least two different pin-type wiper arms include a first pin-type wiper arm having a locking tab extending past the first arm's pin; and a second pin-type wiper arm having a locking tab that does not extend past the second arm's pin such that when the second arm is connected to the connector the locking tab of the second arm is received in either the aperture in the distal shelf or the aperture in the proximal shelf of the connector.

In certain embodiments, the distance between the outside surfaces of the peripheral side walls is such that a connector is capable of being attached to the first pin-type windshield wiper arm, such that the locking arm of the first pin-type windshield wiper arm extends past the at least two opposing peripheral side walls of the connector and the locking tab of the first pin-type wiper arm extends along the outer surface of one of the at least two opposing peripheral side walls of the connector.

In certain embodiments, the connector comprises a spacer cavity in the peripheral side wall capable of receiving a spacer on one of the at least two pin-type wiper arms.

In some embodiments, the connector for connecting a windshield wiper assembly to a wiper arm may have a peripheral wall having at least two opposing peripheral side walls and a top surface extending from one of the two opposing peripheral side walls to the other. The opposing peripheral side walls may each have at least one retaining pin aperture aligned with one another and sized to be capable of slidably accepting a retaining pin of at least one pin-type windshield wiper arm.

In some embodiments, the connector may further have at least one aperture in the top surface sized such that it is capable of accepting a first locking tab that extends from a locking arm on a first pin-type of windshield wiper arm. The distance between the outside surfaces of the peripheral side walls may be such that the connector is capable of being attached to a second pin-type windshield wiper arm, such that a second locking arm of the second pin-type windshield wiper arm extends past the at least two opposing peripheral side walls of the connector and the locking tab extends along an outer surface of one of the at least two opposing peripheral side walls of the connector.

In some embodiments, the top surface of the connector may further have a proximal shelf and a distal shelf such that the connector is capable of having the bottom side of the first and/or second locking arms of the first and/or second pin-type windshield wiper arms rest on the proximal shelf when the connector is locked to each of the first pin-type and second pin-type windshield wiper arms. In some of these embodiments, the proximal shelf of the connector may be recessed relative to the distal shelf.

In some embodiments, the connector may have at least two internal support walls extending downward from the top surface and substantially along the longitudinal length of the connector, and at least one rivet passage and arcuate rivet clip in each of the internal support walls for accepting and securing a rivet of a wiper blade, thereby securing the connector to the wiper blade. In some embodiments the connector may also have at least one rivet aperture in each of the at least two opposing peripheral side walls capable of accepting a rivet of a mounting base of a wiper blade in order to secure the connector the wiper blade assembly, such rivet apertures in alignment with respective rivet passages in the internal support walls. In some of these embodiments, the connector may be capable of being secured to the mounting base of a windshield wiper blade assembly via the rivet through the mounting base.

In some embodiments, the connector is capable of connecting to the at least one pin-type wiper arm such that a bottom side of a locking arm of the at least one pin-type windshield wiper arm rests on the proximal shelf when the connector is locked to the at least one pin-type windshield wiper arm. In some of these embodiments the distal shelf may be sloped.

In some embodiments, the connector may further have a tower which assists in securing the locking arm of the at least one pin-type windshield wiper. In some embodiments the tower may have an extension to assist in securing the locking arm of the at least one pin-type windshield wiper. In some embodiments the tower may have a strengthening rib. In some embodiments, longitudinal ribs may be provided on the distal shelf adjacent the tower.

In some embodiments, the connector may be fabricated as a single piece.

In some embodiments, an aperture in the proximal shelf of the top surface may be positioned to be capable of receiving a locking tab of the locking arm of a pin-type windshield wiper arm when the connector is locked to the windshield wiper arm such that the connector may be prevented from sliding off of the windshield wiper arm.

In some embodiments, the connector may also have a spacer cavity in a peripheral side wall sized to be capable of accepting a spacer of a pin-type wiper arm having a spacer.

In some embodiments, a wiper blade assembly has a wiper blade and a connector capable of connecting to the wiper blade and further capable of connecting the wiper blade to at least two different pin-type wiper arms wherein each of the at least two different pin-type wiper arms has a locking arm.

In some of these embodiments, the at least two different pin-type wiper arms include at least one pin-type wiper arm having a locking tab extending past the arm's pin; and at least one other pin-type wiper arm having a locking tab that does not extend past the other arm's pin. In some embodiments, the at least two different pin-type wiper arms may include at least one pin-type wiper arm having a spacer on the arm's pin; and at least one other pin-type wiper arm that does not have a spacer on the other arm's pin.

In some embodiments, the wiper blade assembly may have a connector that can connect to the wiper blade by passing a rivet on the wiper blade through at least two rivet passages on the connector, into at least two arcuate rivet clips on the connector. In some embodiments, the wiper blade assembly may have a connector having a peripheral wall having at least two opposing side walls, a top surface, an aperture in the top surface sized to accept a windshield wiper arm locking tab that extends from a locking arm on a windshield wiper arm. The connector's opposing peripheral side walls may each have a retaining pin aperture aligned with one another and sized to be capable of slidably accepting a retaining pin on a windshield wiper arm.

In some embodiments, a wiper blade assembly may have a wiper blade having a rivet and a connector having a peripheral wall having two opposing side walls, a spacer cavity in at least one of the two opposing side walls, a top surface having a flat distal shelf and a proximal shelf, a locking aperture capable of receiving the locking tab of a pin-type wiper arm, at least two internal support walls, each of the two internal support walls having a rivet passage and an arcuate rivet clip, a retaining pin aperture extending through the two opposing side walls and the two internal support walls, and a width between the opposing side walls of the peripheral wall that is different at the proximal shelf than the width between the opposing side walls at the distal self.

FIG. 1 is a top perspective view of an embodiment of a connector 1 of the disclosure. The connector 1 has a front end or distal end 2, and a back end or proximal end 3. The proximal/back end 3 is the side that generally engages, and is closest to the wiper arm. The distal/front end 2 is generally furthest from the wiper arm. However some embodiments of the connector 1 wiper arms may connect in a normal orientation to some wiper arms, and in a reverse orientation to other wiper arms. A peripheral wall 4 extends around the periphery of connector 1. The peripheral wall 4 includes a proximal portion, a distal portion, and opposing longitudinal side portions 17, 18 that connect the proximal and distal portions. The opposing longitudinal side sections may be referred to as a first side 17 and a second side 18. A top wall 100 having a top surface 101 that may extend between opposing peripheral wall side portions. The top surface comprises a distal shelf 12 and proximal shelf 13, that may define one or more locking apertures 5, 7. As shown in FIGS. 1 and 3-5, the proximal shelf 13 may be recessed such that it is at a lower level than the proximal shelf 12. The connector 1 may also be provided with a tower 9 rising from either the proximal shelf 12 or the distal shelf 13. Other apertures (6, 8) on the distal shelf 12 provide access for slides used in the molding process, may also be sized and configured to serve as locking apertures—to receive a locking tab of a wiper arm—or may not perform any function when used to secure a wiper arm to the connector 1. As new wiper arms are developed with locking arms of various sizes and shapes, one of skill in the art will recognize that these apertures, 6 and 8, could be adapted to be additional locking apertures for new arms.

Figure 9:
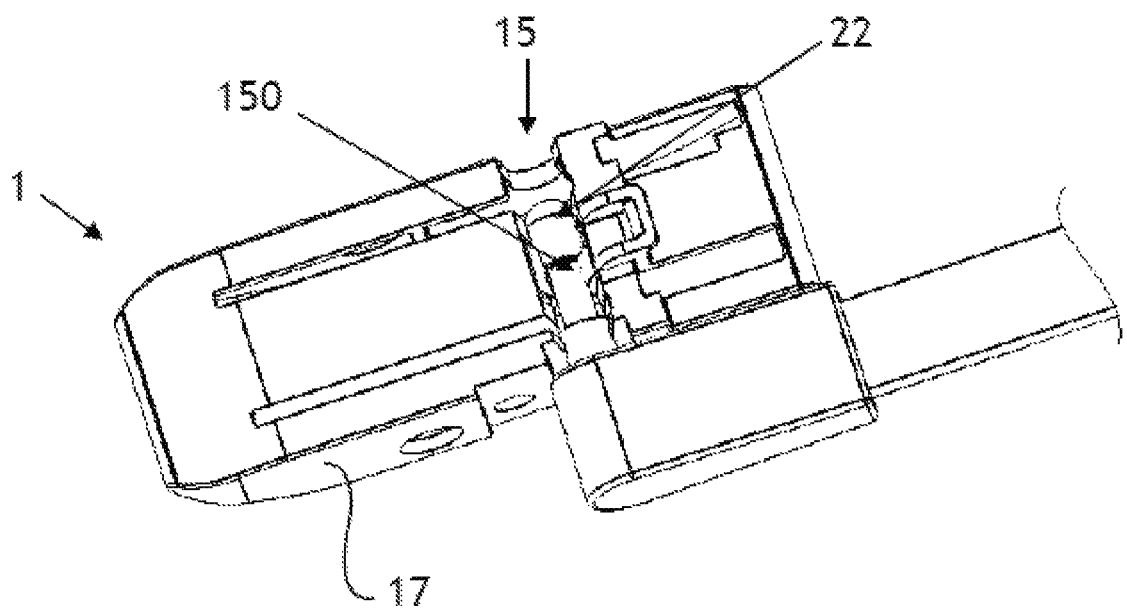
FIG. 9 illustrates a second traditional pin wiper arm connected to a connector shown in FIG. 1.

The connector 1 is preferably configured with a first pin aperture 15, 15a, 15b, 15c, 15d) to accommodate a retaining pin 22 of at least one pin-type wiper arm. The aperture may be an arcuate aperture, and may include an opening provided on the distal shelf 12 through which the retaining pin may be inserted, as illustrated in FIG. 1 and FIG. 9. Alternatively, the first pin aperture may be circular and located underneath the distal shelf 12. Depending on the arms desired to be accommodated by the connector 1, the aperture 15 need not extend completely through the connector. However, for greater wiper arm coverage, some embodiments are configured such that the first pin aperture 15 goes through both sides of the connector 1.

The connector 1 may further include a first pin passage (15) including a plurality of first pin apertures (15a, 15b, 15c, 15d), and may further include a first cantilever 150 which resides in and deflectably interrupts the first pin aperture. For the sake of clarity, a first pin passage 15 may alternatively be referred to herein as a singular first pin aperture 15. Thus when a traditional pin arm which has a central radius that is smaller than its radius at either end of the pin is inserted into the first pin aperture 15, the first cantilever 150 deflectably engages the pin adjacent to the narrower, central radius of the pin, thereby securing the connector 1 to the wiper arm. The first cantilever 150 precludes lateral movement of the wiper arm by acting as a detent shoulder that engages the larger radius of the traditional pin arm and prevents it from sliding out. The first cantilever 150 may further have a rounded, or chamfered shape, to facilitate insertion of the pin—whether a traditional pin wiper arm, or a pin-and-locking-arm type wiper arm—and to secure the pin arm against vertical movement.

For pin-and-locking-arm type wiper arms, the top surface of the connector may provide one or more locking apertures 5, 7 and an outside edge to accommodate locking tabs 24 on the locking arms 21 of the varying sizes and configurations of pin-and-locking-arm type windshield wiper arms. Additionally, as discussed above, some arms may connect in a reverse configuration, such that apertures 6, 8, act as locking apertures. As such the connector 1 may be configured such that the orientation of either the windshield wiper or the connector 1 can be reversed based on the particular windshield wiper arm that is being used.

The retaining tower 9 provides a structure for assisting in securing and maintaining proper positioning of a locking arm 21, as illustrated in FIGS. 10A, 10B, 11, and 12. The tower 9 may also comprise an extension 10 therefrom that functions to secure and lock the locking arm 21 in place by holding the locking arm 21 in place abutting the proximal shelf 13 and preventing the locking arm 21 from moving upward from the proximal shelf 13. The tower 9 may also be provided with a strengthening rib 11 which provides additional structural support for the tower 9.

Figure 8:
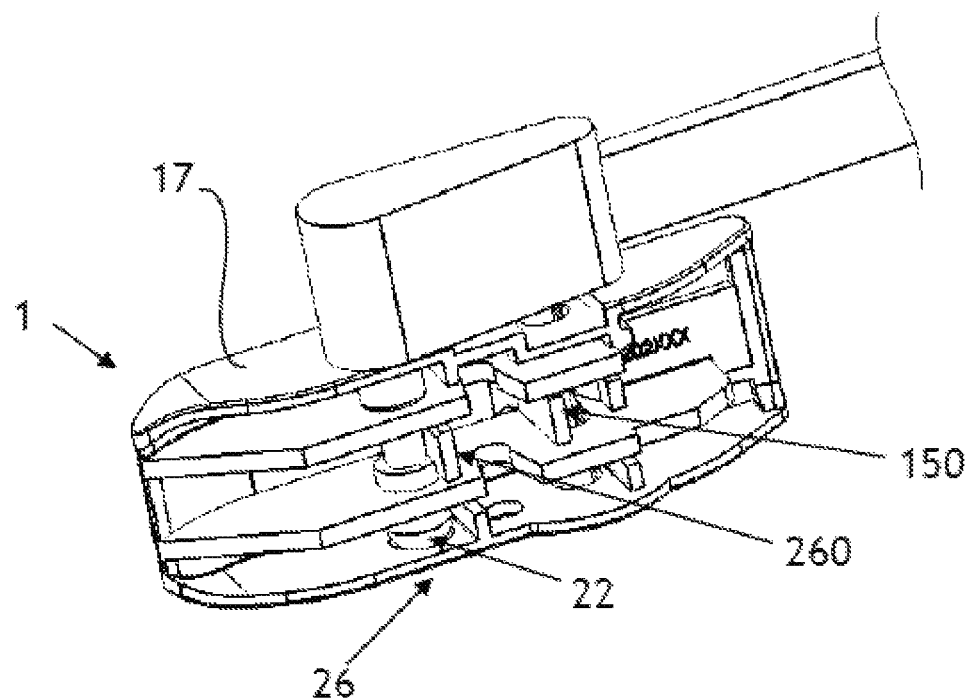
FIG. 8 illustrates a traditional pin wiper arm connected to the connector shown in FIG. 1.

The connector 1 may also be configured with a second pin passage (26) including a plurality of second pin apertures (26a, 26b, 26c, 26d) to accommodate a retaining pin 22, as illustrated in FIG. 8. For clarity sake, a second pin passage 26 may alternatively be referred to herein as a singular second pin aperture 26. Such second pin apertures may be utilized to engage a retaining pin 22 in wiper arms without a locking arm or in wiper arms that have a locking arm that is spaced farther apart from the retaining pin than previously described herein. The second pin aperture may similarly be configured to connect to both traditional pin arms, and to pin-and-locking-arm type wiper arms, and may further include a second cantilevered structure 260 for securing the smaller central radius of a traditional pin arm.

Figure 2:
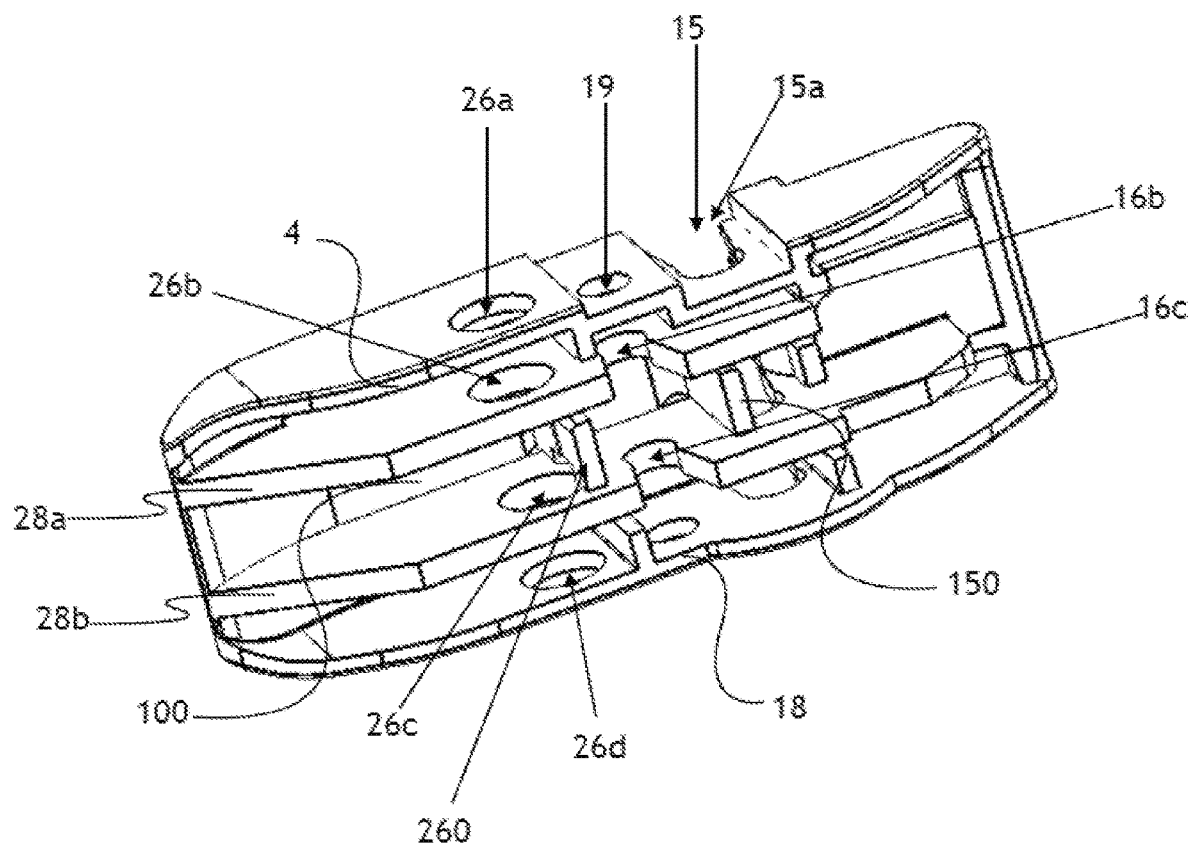
FIG. 2 illustrates a bottom perspective view of the connector shown in FIG. 1.

Accordingly, the pin apertures (15, 15a, 15b, 15c, 15d), (26, 26a, 26b, 26c, 26d) may also include a cantilever structure 150, 260 therein for engaging retaining pins that are inserted into the apertures. For instance, the first pin aperture 15 is structured to receive a retaining pin by side insertion from either the first side 17 or second side 18 or downward insertion from the distal shelf 12 through the side to side aperture 15. In either case, the cantilever structure 150 engages the retaining pin and holds it in place. Similarly, the second pin aperture (26, 26a, 26b, 26c, 26d), as illustrated in FIG. 2, is structured to receive and engage (via the cantilever structure 260) a retaining pin by side insertion from either the first side 17 or second side 18 (illustrated in FIG. 8). Just as the first pin aperture 15 is provided with an opening in the distal shelf 12, the distal shelf 12 may be provided with a second opening (not shown) for the second pin aperture 26 to allow vertical insertion of the pin from above. As discussed above, the cantilever structures 150, 260 are structured to partially intervene within the apertures (see FIG. 5) for engaging the retaining pin therein.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece.

Figure 11:
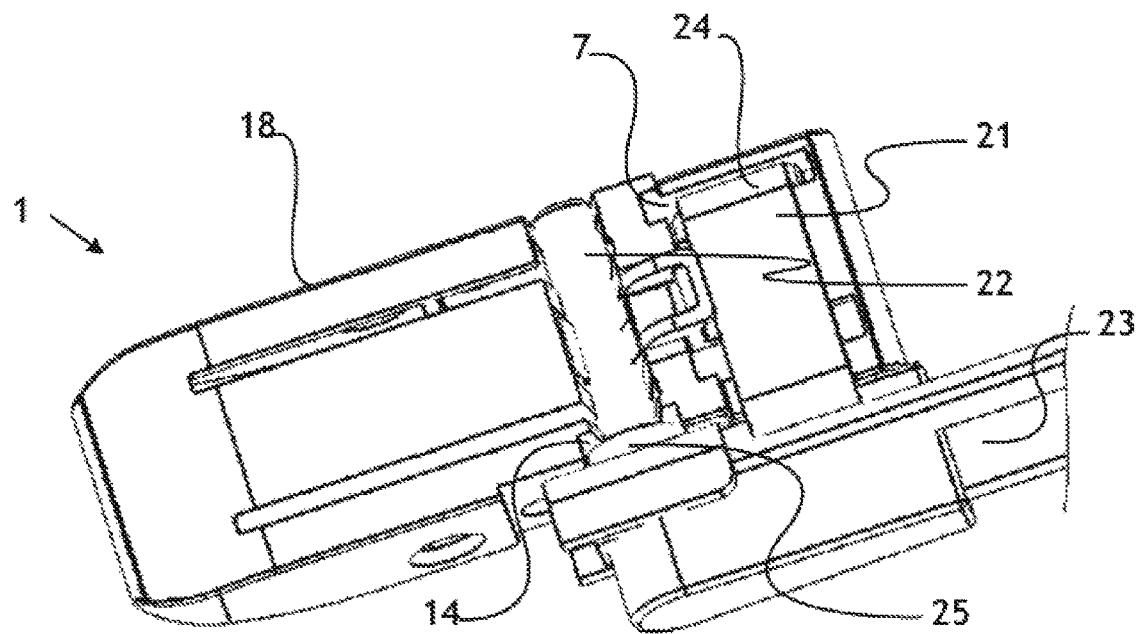
FIG. 11 illustrates a second pin-plus-locking-arm type wiper arm connected to the connector shown in FIG. 1.

FIG. 2 is a bottom perspective view of an embodiment of a connector 1 that illustrates the internal support structure inside the connector 1. In particular, internal support walls 28a, 28b provide rigidity and structural strength to the connector 1. The support walls extend downward from the top wall 100 and can extend substantially along the length of the connector continuously, or intermittently, having gaps along the way. In this embodiment, the first side 17 of the connector 1 has a recessed cavity 14 which can accommodate a spacer 25 present in certain wiper arms (see FIG. 11). In some embodiments, as illustrated in FIGS. 1 and 11, the first side 17 may have a stepped recessed cavity that is structured to accommodate a spacer 25 and the head region of the end of the wiper arm. Some embodiments may have not have a recessed cavity 14, while others may have one on both sides of the connector 1. Still other connectors may have nested recessed cavities 14 of differing sizes on the same side of the connector 1 at the same retaining pin aperture 15. Similarly, pin aperture 26a may be sized and shaped to accommodate a spacer 25, such that it is larger than pin aperture 26b which may be sized and shaped to accommodate the pin only. The first side may also be configured to be continuous, without recessed cavities 14 or stepped cavities, or may have a spacer cavity sized and shaped to receive a spacer without need to recess the entire first side 17. It will be appreciated that the details of whether to have and where to put recessed cavities 14 or spacer cavities, will depend on the particular arms that an embodiment of the invention is designed to accommodate. The second side 18 may be shaped such that the width of the connector at the distal shelf 12 is greater than the width of the connector at the proximal shelf 13. The second side 18 may also be provided with recessed cavities 14, stepped cavities or spacer cavities, as may be necessary to accommodate desired arms. Similarly, the width of the connector at each shelf 12, 13, and the location and shape of the various apertures, particularly apertures 5-8 will be dependent on the arms that an embodiment seeks to accommodate. The first and second sides 17, 18 may also be provided with a rivet opening 19 which may accommodate or secure a rivet, or outer notch or peg on a mounting base to help secure the connector 1 to a wiper blade.

Figure 3:
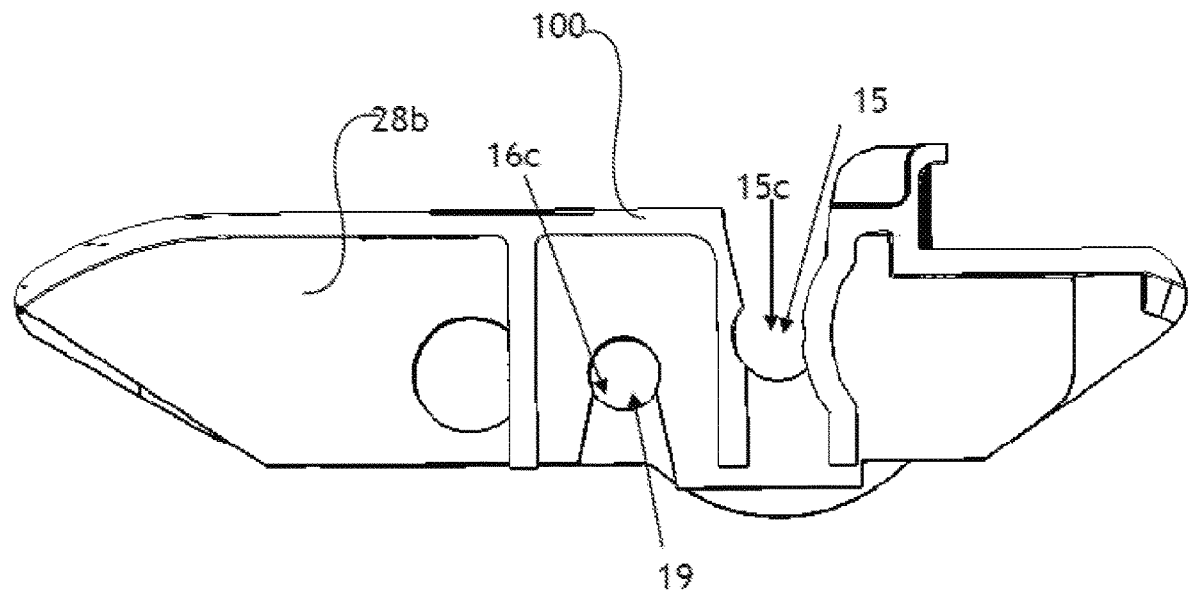
FIG. 3 illustrates a sectional view along a central, vertical plane of the connector shown in FIG. 1.
Figure 4:
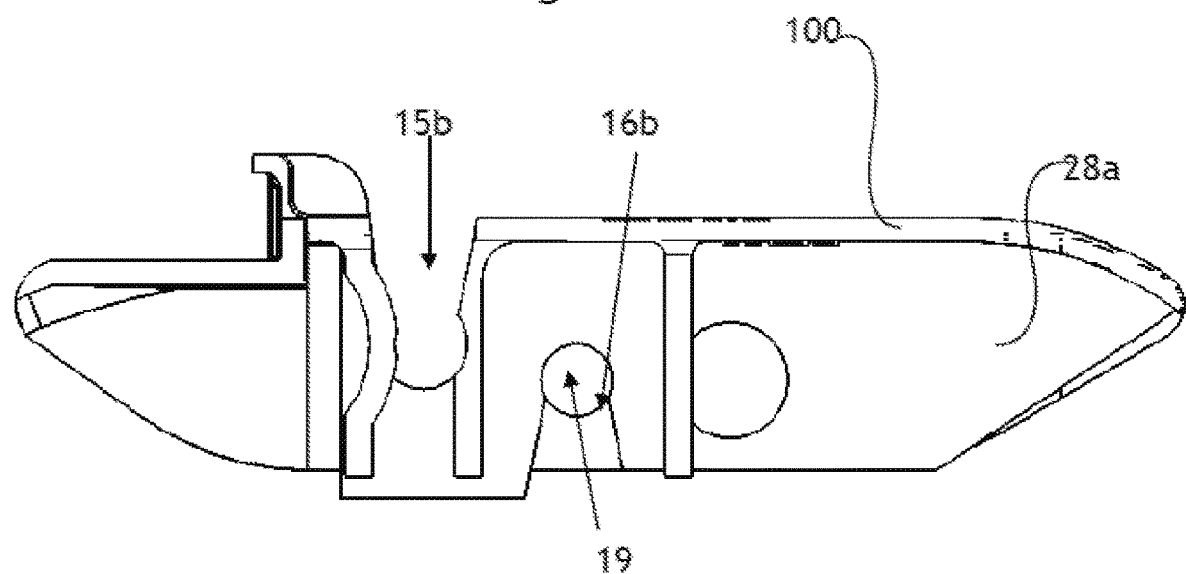
FIG. 4 illustrates a sectional along a central, vertical plane of the connector shown in FIG. 1.

FIG. 3 and FIG. 4 are opposing sectional views along a central, vertical plane of the embodiment of a connector 1 illustrated in FIG. 1. As illustrated in FIG. 3, the support wall 28b may have a retaining pin aperture 15 for the retaining pin 22 of a pin-type wiper arm, and a rivet passage 19 that allows a rivet on the wiper blade to pass into an arcuate rivet clip (16c) which secures the connector 1 to the rivet of the wiper blade. Similarly, the support wall 28a shown in FIG. 4 may be nearer to the first side 17 of the connector 1 may also have a pin aperture 15b, and an arcuate rivet clip 16b. The arcuate rivet clip 16b may receive and secure a rivet in a mounting base of a wiper blade. Likewise support wall 28b shown in FIG. 4 may be nearer to the second side 18 of the connector 1, and may also have a pin aperture 15c, and an arcuate rivet clip 16c. The arcuate rivet clip 16c may also receive and secure a rivet in a mounting base of a wiper blade. In addition to the peripheral walls 4, the internal support walls 28a, 28b also provide rigidity and strength to the connector 1. Other methods for connecting the connector 1 to the wiper blade known in the art are contemplated within the scope of the present invention, including having pin passages and pin clips which connect to one or more pins in the wiper blade; having one or more detents in the connector which engage shoulders in apertures or recesses in the wiper blade; having recesses in the peripheral wall of the connector that can accept and secure a rivet or pin; having deflectable or rigid pins or detents in the connector, which engage corresponding recesses, apertures or shoulders in the wiper blade; and other form-fitting or friction fitting connections and the like.

Figure 5:
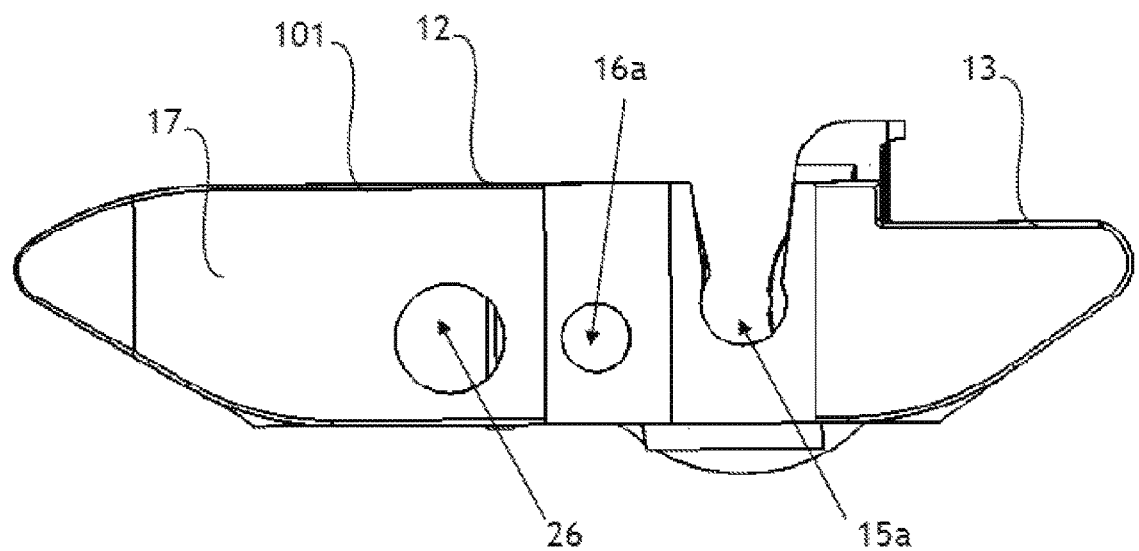
FIG. 5 illustrates a side view of the connector shown in FIG. 1.
Figure 6:
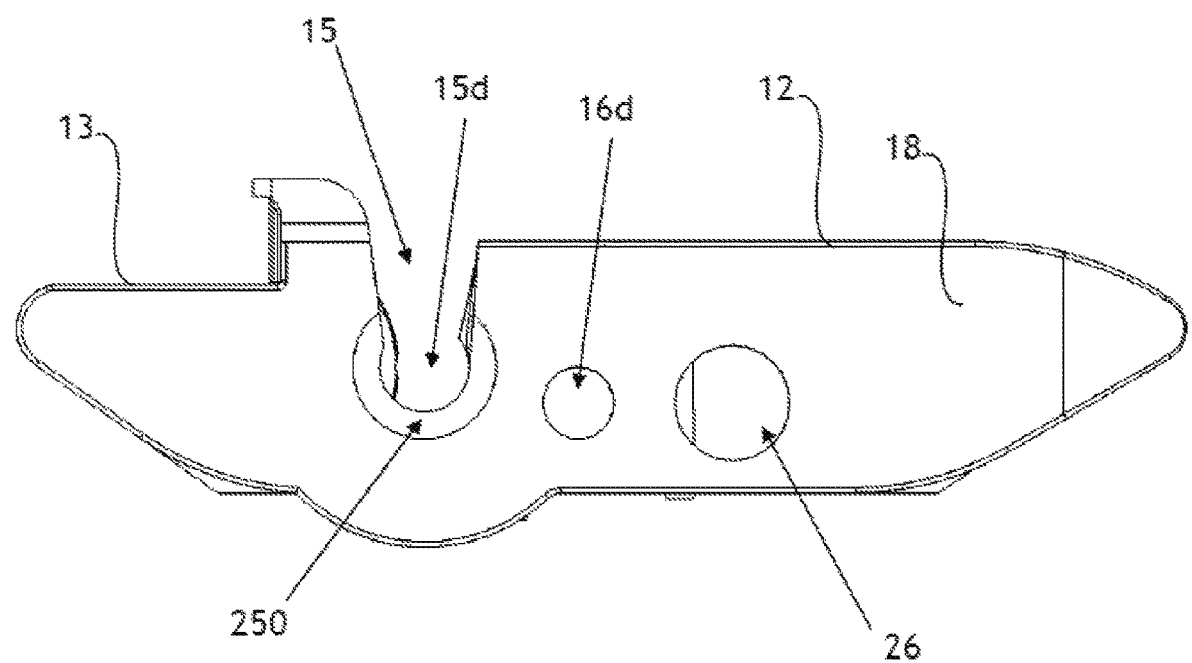
FIG. 6 illustrates an opposite side view of the connector shown in FIG. 1.

FIG. 5 is a side view of the embodiment of the connector 1 shown in FIG. 1, while FIG. 6 is an opposite side view of the connector 1 shown in FIG. 5. FIG. 5 illustrates the first side 17 and distal shelf 12 and proximal shelf 13, and FIG. 6 illustrates the second side 18 and distal shelf 12 and proximal shelf 13. As illustrated in FIGS. 5 and 6, retaining pin aperture 15a on the first side 17 is shown aligned with retaining pin aperture 15d on second side 18, and with the retaining pin apertures 15b and 15e in the internal support walls 28. Retaining pin apertures (15a-d) are sized to snugly fit retaining pins on windshield wiper arms (windshield wiper arms are illustrated in FIGS. 10A, 10B, 11, and 12).

In certain embodiments, rivet apertures 19 may be included, and are aligned with the arcuate rivet clips 16b, 16c (shown in FIGS. 3 and 4) in the support walls 28. These apertures 19 may accommodate portions of the rivet on the outer side of the mounting base of a wiper arm, or may engage projections, pegs or notches on the outside of a mounting base to help secure the connector to the wiper blade. Alternatively, some embodiments may not include such apertures.

In order to accommodate retaining pins of different sizes, some embodiments may have additional retaining pin apertures, such as additional second pin aperture 26 illustrated in FIGS. 5 and 6, either next to the first retaining pin aperture 15, or on the opposite side of the rivet aperture 16 (as shown). The first pin aperture 15 and/or second pin aperture 26 may also be embodied as a flexible retaining pin clip which can accommodate more than one size of pin, depending upon the types of arms and the sizes of the pins that any particular embodiment seeks to accommodate.

FIGS. 5 and 6 also show the cantilever structures 150, 260 within the side-to-side apertures (15a, 15b, 15c, 15d), (26a, 26b, 26c, 26d) for engaging retaining pins that are inserted into the apertures. For instance, the side-to-side apertures (15a, 15b, 15c, 15d) are structured to receive a retaining pin by side insertion from either the first side 17 or second side 18 or downward insertion from the distal shelf 12 through the side to side aperture 15. In either case, the cantilever structure 150 engages the retaining pin and holds it in place. A structure where the opening in the distal shelf 12 is closed is also contemplated. The additional side-to-side aperture (26a, 26b, 26c, 26d) is structured to receive and engage (via the cantilever structure 260) a retaining pin by side insertion from either the first side 17 or second side 18; however, a structure that includes an opening in the distal shelf 12 opening is also contemplated. The cantilever structures 150, 260 are structured to partially intervene within the apertures as illustrated in FIGS. 5 and 6 for engaging the retaining pin inserted therein.

FIG. 6 also illustrates that the second side 18 may have a recessed spacer projection 250 that is in alignment with the first pin aperture 15 and projects from the second side 18. The spacer projection may be sized and shaped to create sufficient space to properly align a locking tab of a pin-and-locking-arm type wiper blade such that the locking tab can engage a locking aperture 5,6,7,8 or the first side 17 of the connector 1.

Figure 7A:
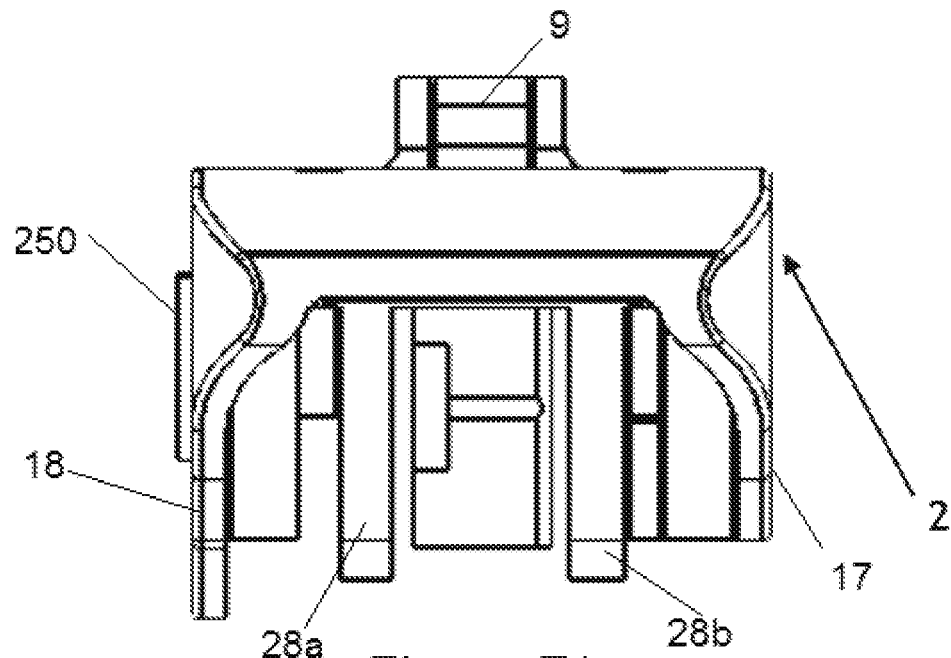
FIG. 7A illustrates front end view of the connector shown in FIG. 1.

FIG. 7A is a distal end view of an embodiment of the connector 1 that illustrates distal end 2. Those skilled in the art will recognize that the size and shape of distal end 2 can vary so long as it does not interfere with attachment of the connector 1 to the desired wiper arms.

Figure 7B:
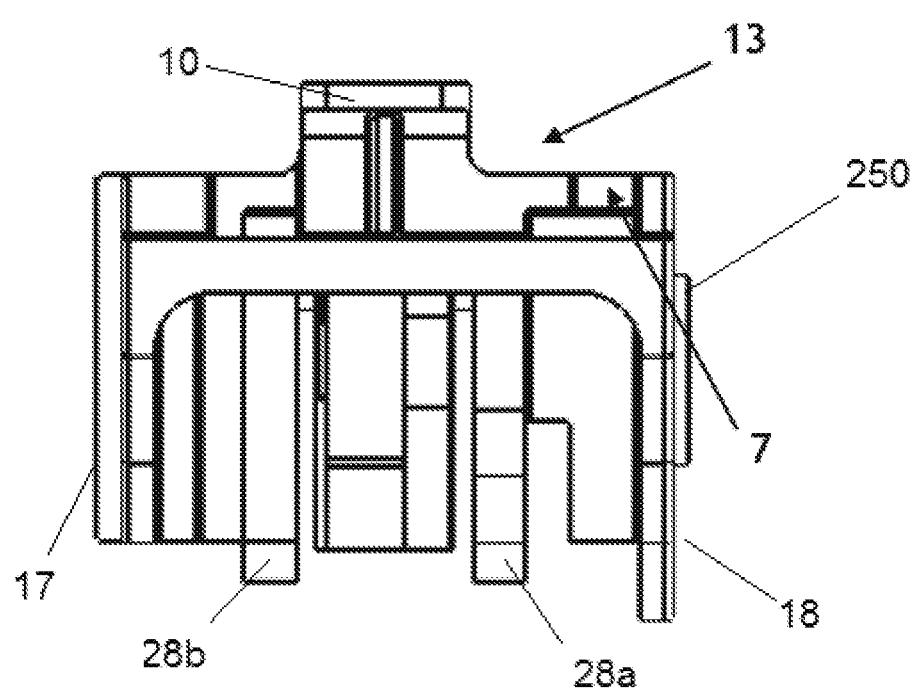
FIG. 7B illustrates back end view of the connector shown in FIG. 1.

FIG. 7B is a proximal end view of a preferred embodiment of the connector 1 that illustrates proximal end 3. Also shown in this figure is the locking aperture 7 on proximal shelf 13.

FIG. 8 illustrates an embodiment of a connector 1 of the disclosure connected to a traditional pin-type windshield wiper arm in one of several possible configurations. As shown, the retaining pin 22 of the wiper arm is inserted into the additional side-to-side aperture (26) and the cantilever structure 260 engages central narrow radius of the retaining pin 22 to lock it into place. The retaining pin 22 could be inserted into the additional side-to-side aperture (26) from either the first side 17 (as illustrated) or second side 18. As shown, the end of the retaining pin 22 may have a slightly larger diameter than the rest of the retaining pin 22, creating an edge that the cantilever structure 260 may rest against and function to prevent the retaining pin 22 from being released from the connector 1.

FIG. 9 illustrates an embodiment of a connector 1 of the disclosure connected to a second traditional pin-type windshield wiper arm in another possible configuration. As shown, the retaining pin 22 of the wiper arm is inserted into the side-to-side aperture (15) and the cantilever structure 150 engages the central, narrow radius portion of retaining pin 22 to lock it into place. The retaining pin 22 could be inserted into the side-to-side aperture (26) from either the first side 17 (as illustrated) or second side 18, or through downward insertion. As shown, the end of the retaining pin 22 may have a slightly larger diameter than the center portion of the retaining pin 22, creating an edge that the cantilever structure 150 may rest against and function to prevent the retaining pin 22 from being released from the connector 1.

Figure 10A:
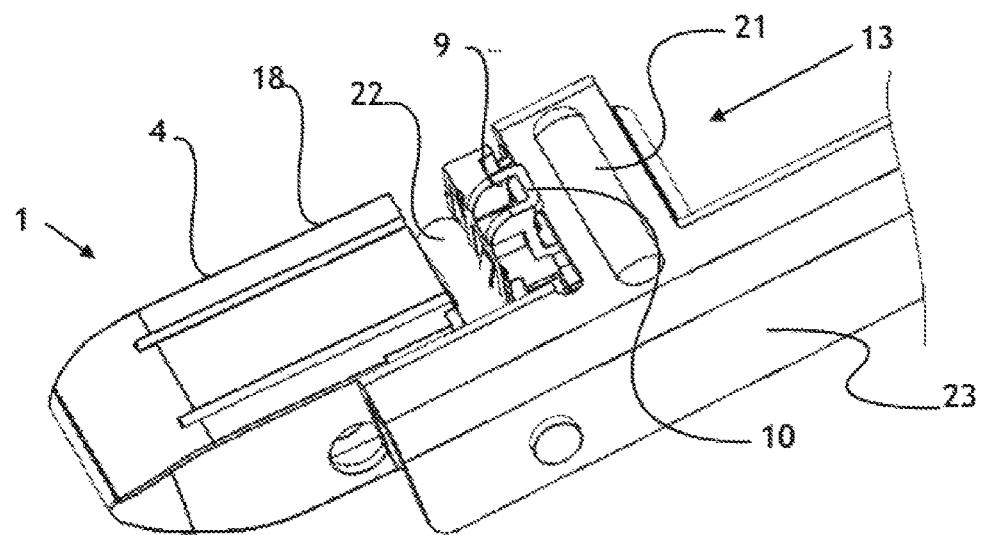
FIG. 10A illustrates a pin-plus-locking-arm type wiper arm connected to the connector shown in FIG. 1.
Figure 10B:
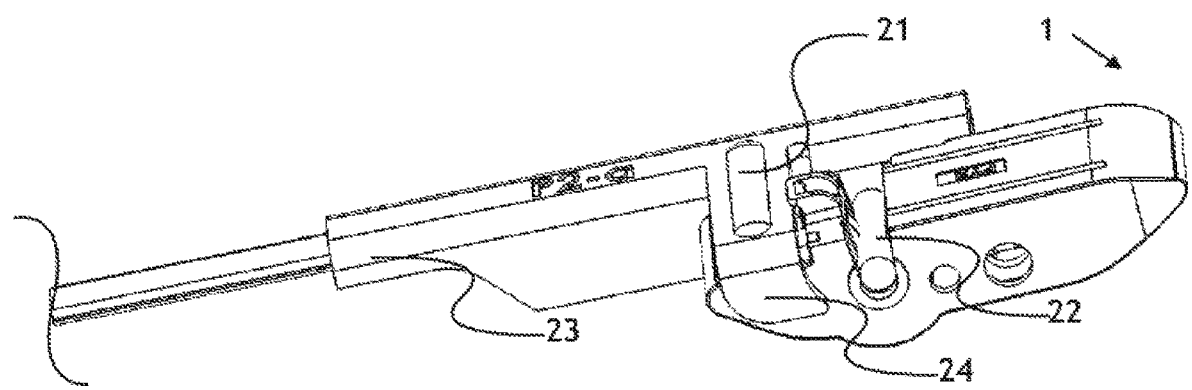
FIG. 10B illustrates a second view of the pin-plus-locking-arm type wiper arm shown in FIG. 10A connected to the connector shown in FIG. 1.

FIG. 10A is a top perspective view of a pin-and-locking-arm type windshield wiper arm attached to a connector 1 of the disclosure in yet another possible configuration. The support arm 23, the locking arm 21, and the retaining pin 22 of the windshield wiper arm are shown. In certain embodiments of the connector, the retaining pin side to side apertures 15a-d in the connector 1 are sized to snugly fit the retaining pin 22. When the wiper blade is slipped over the retaining pin and turned to the secured and locked position (whereby the retaining clip 9 having an extension 10 therefrom locks the locking arm 21 in place by holding the locking arm 21 in place abutting the proximal shelf 13 and preventing the locking arm 21 from moving upward from the proximal shelf 13), the locking tab 24 will extend over the peripheral wall 4 on the second side 18 of the connector 1 to prevent connector 1 from sliding off of the retaining pin 22. The wiper arm may also be configured in the opposite orientation (not shown) such that when the wiper blade is slipped over the retaining pin and turned to the secured and locked position, proximal shelf 13 of connector 1 will rest against the bottom side of the locking arm 21 and locking tab 24 will extend over the peripheral wall 4 on the first side 17 of the connector 1. FIG. 10B is a top perspective view of the wiper arm/connector of FIG. 10A from the opposite orientation, such that the locking tab 24 is shown extending over the peripheral wall on the first side 17 of the connector 1.

FIG. 11 is a top perspective view of a connector 1 of the disclosure as attached to a different pin-and-locking-arm type windshield wiper arm that illustrates the support arm 23, the locking arm 21, and the retaining pin 22. A spacer 25 is also illustrated on the base of the retaining pin 22. This spacer 25 fits into the spacer cavity 14. This embodiment differs from the embodiment illustrated in FIGS. 110A-10B in that the locking arm 21 is shorter than retaining pin 22. As a result, locking tab 24 will not rest against the outer peripheral wall 4 of connector 1. Rather, it will extend through aperture 7 on the connector 1.

Figure 12:
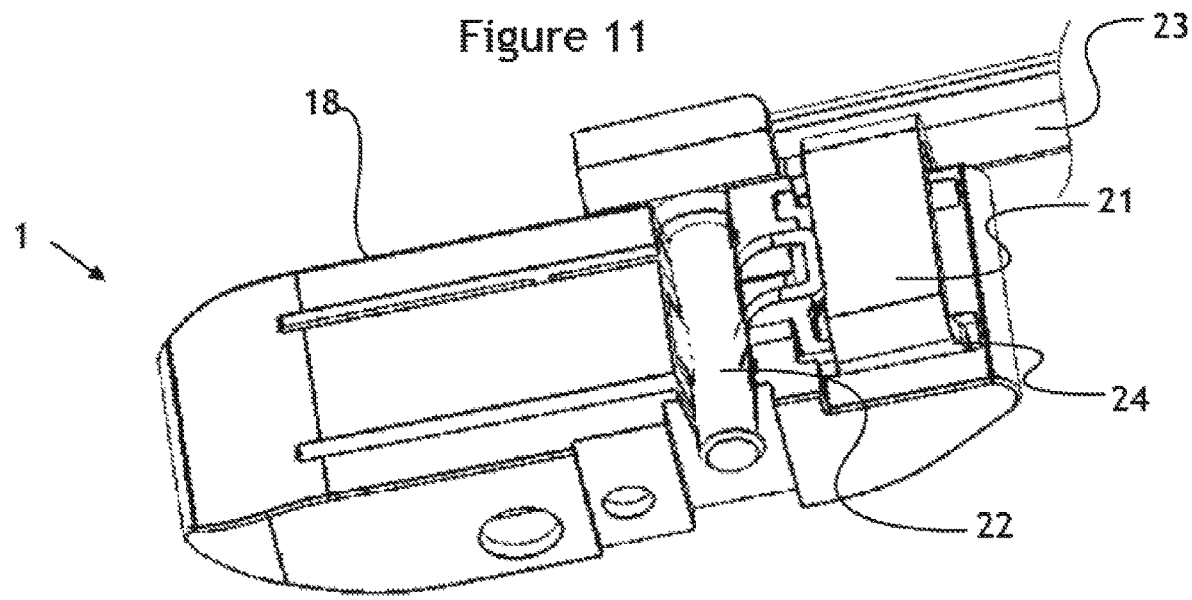
FIG. 12 illustrates a second view of the pin-plus-locking arm type wiper arm shown in FIG. 11 connected to the connector shown in FIG. 1.

FIG. 12 is a top perspective view of a connector 1 of the disclosure as attached to yet another pin-and-locking-arm type windshield wiper arm. The support arm 23, the locking arm 21, and the retaining pin 22. In this illustration, the elements of the windshield wiper arm, i.e., the support arm 23, the locking arm 21, and the retaining pin 22, are in the opposite orientation such that the retaining pin 22 engages the connector 1 from the second side 18. As a result, locking tab 24 will extend through aperture 5 on the connector 1.

As can be seen from FIGS. 10A, 10B, 11, and 12, the same connector 1 can be used with differing windshield wiper arms. This allows a reduced inventory that can satisfy the needs of a larger number of windshield wiper arm types.

In operation, the windshield wiper connector 1 disclosed by this invention allows a single windshield wiper to be used in conjunction with windshield wiper arms having a wide variety of configurations. This reduces manufacturing cost, inventory cost, and provides for easy replacement of windshield wipers as needed.

Another embodiment of the disclosed concepts is a wiper blade provided with a connector as described above, as shown in FIG. 13. The wiper blade may be of any type suitable for use with the present invention. For example, the wiper blade can be a traditional wiper blade having a plurality of frames which carry a wiper strip and act as a force distribution structure, and having a mounting base. Alternatively, the wiper blade may be a beam blade that acts as a force distribution structure, having one or more spring-elastic beams, a wiper strip, and a mounting base. The wiper blade may also be a hybrid wiper blade, which has a combination of a beam and one or more frames which collectively act as a force distribution structure, a wiper strip, and a mounting base. Regardless of the type of wiper blade, the connector 1 can be adapted to connect to the wiper blade, for example, via a rivet on the wiper blade (which is commonly located in a mounting base or in the frame of the wiper blade) and a rivet passage 19 and arcuate rivet clips 16b, 16c on the connector 1. Any other method discussed above or otherwise known in the art would also be suitable, such as having one or more pins, holes, recesses, channels, or other structure in the wiper blade, and having corresponding pin clips, detents or pins or any other structure complimentary to the structure in the connector 1.

Figure 13:
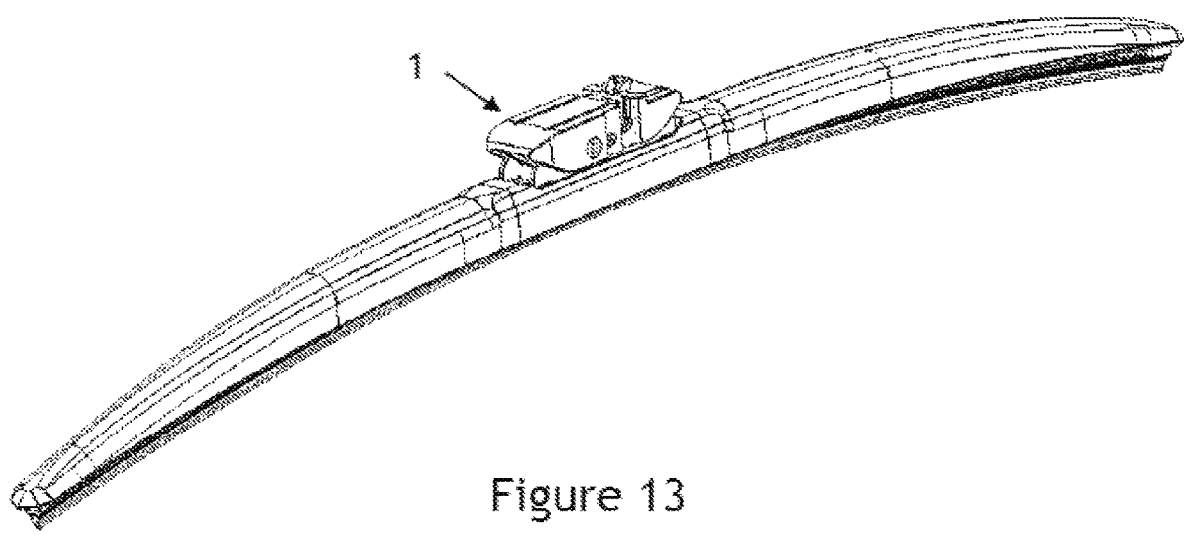
FIG. 13 illustrates the connector shown in FIG. 1 connected to a wiper blade.
Figure 14:
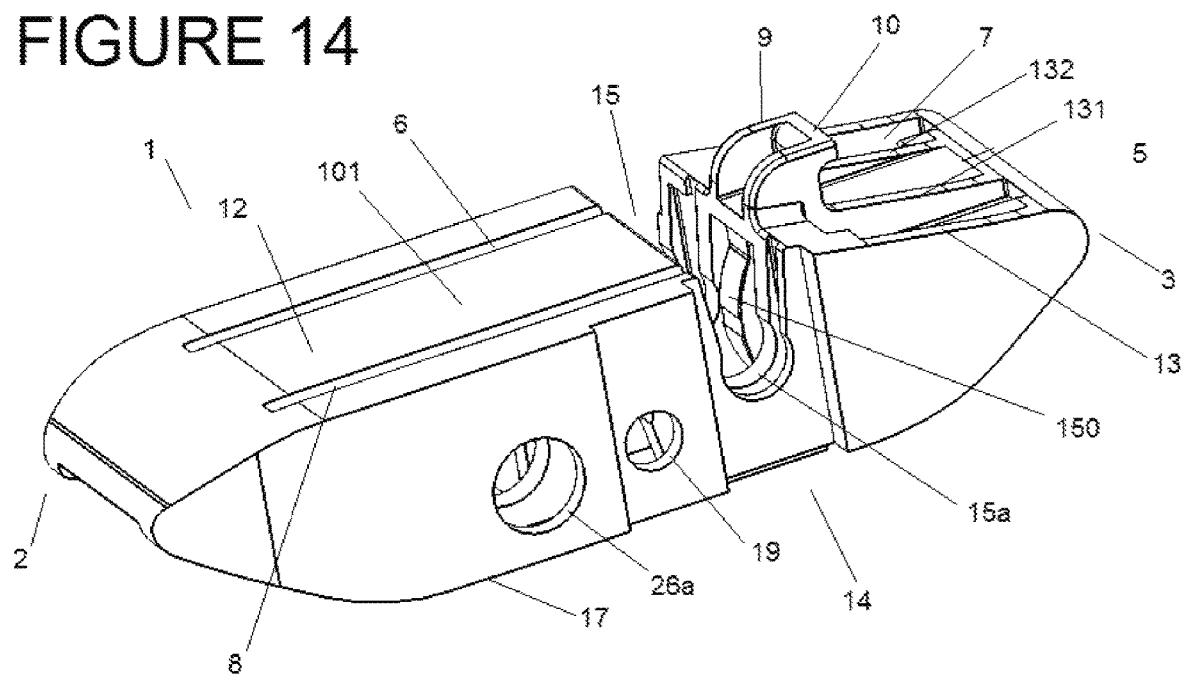
FIG. 14 illustrates a top perspective view of a second embodiment of a connector of the disclosure.

In certain embodiments, as illustrated in FIG. 13, the connector 1 may be connected to the wiper blade prior to connecting to the wiper arm. In certain embodiments, the connector 1 may be connected to the wiper arm prior to being connected to the wiper blade. In certain embodiments, the connector 1 may either be first connected to the wiper arm or to the wiper arm.

Another embodiment of the disclosed concepts is shown in FIGS. 14-21. As shown therein, this embodiment features a distal shelf 13 that is not recessed relative to proximal shelf 12. Instead distal shelf 13 is provided with a slope extending downwardly from the proximal shelf 12. Distal shelf 13 may further be provided with distal ribs 131, 132, which follow the slope of the distal shelf, and provide additional structural support for the tower 9.

Figure 15:
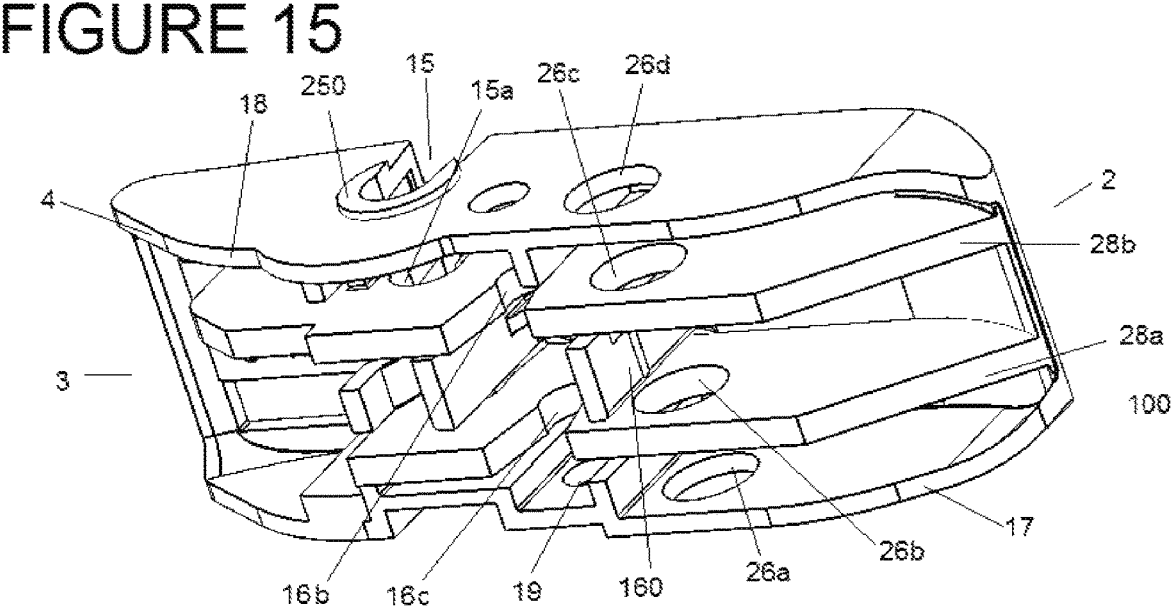
FIG. 15 illustrates a bottom perspective view of the connector shown in FIG. 14.
Figure 16:
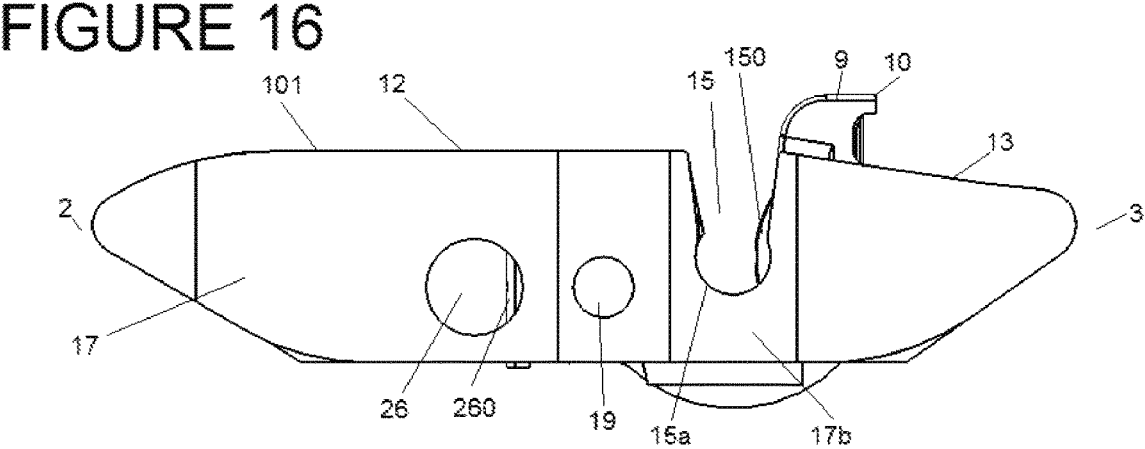
FIG. 16 illustrates a sectional view along a central, vertical plane of the connector shown in FIG. 14.
Figure 17:
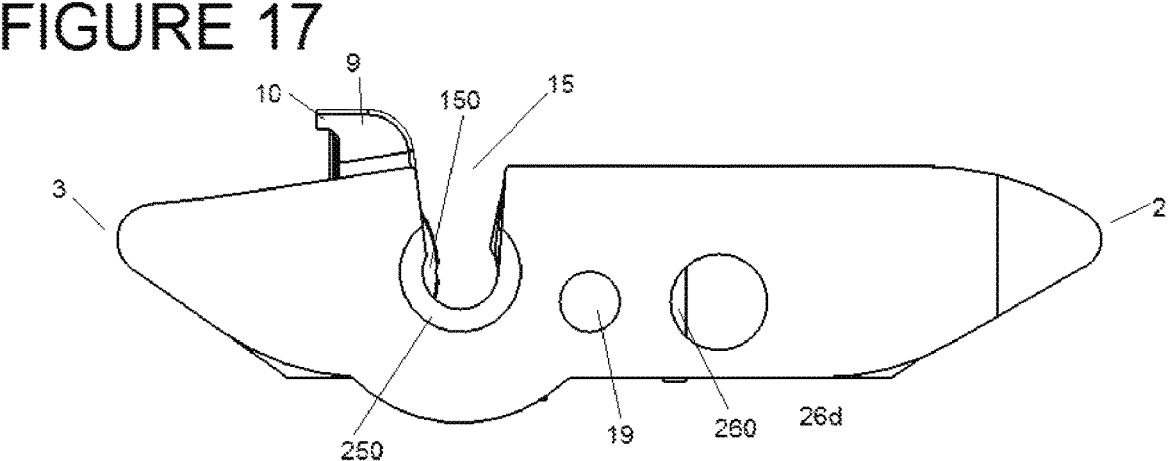
FIG. 17 illustrates a sectional view along a central, vertical plane of the connector shown in FIG. 14.
Figure 18:
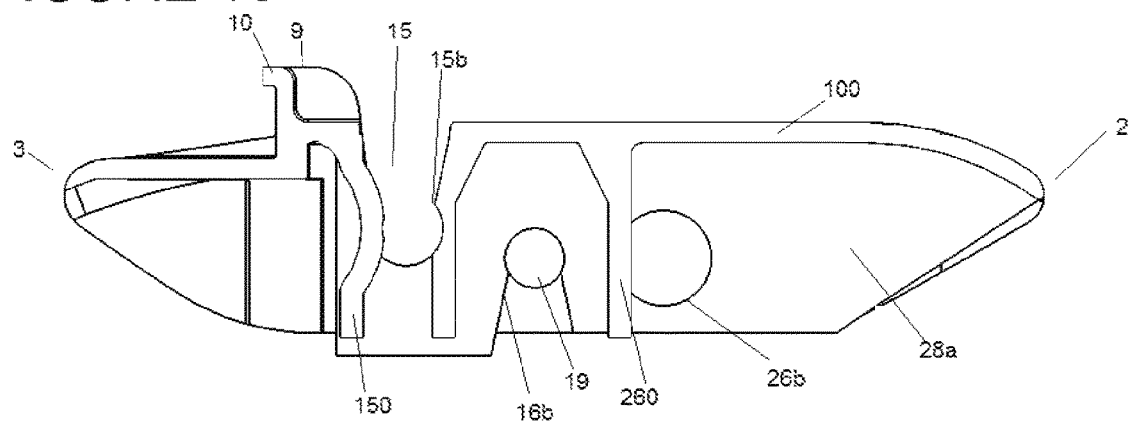
FIG. 18 illustrates a side view of the connector shown in FIG. 14.
Figure 19:
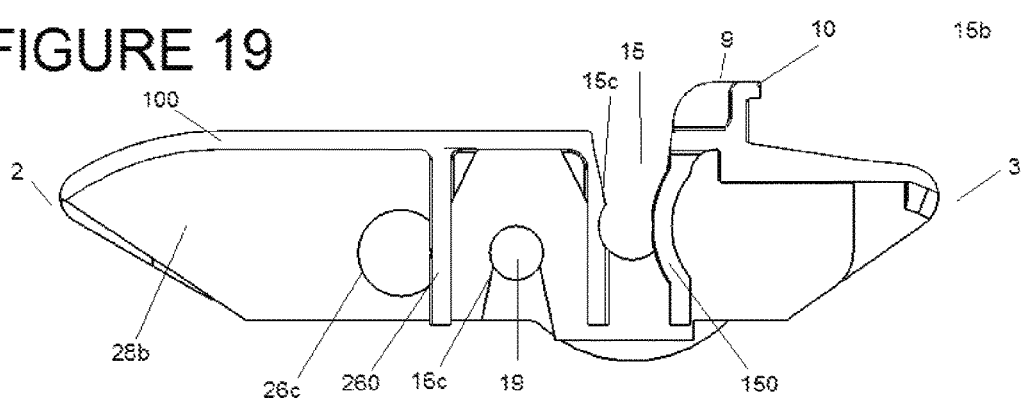
FIG. 19 illustrates an opposite side view of the connector shown in FIG. 14.
Figure 20:
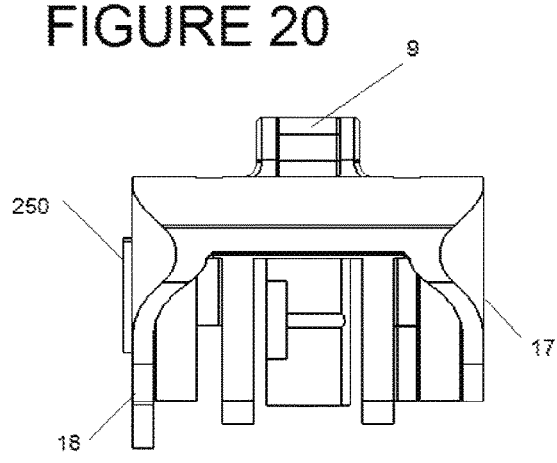
FIG. 20 illustrates front end view of the connector shown in FIG. 14.
Figure 21:
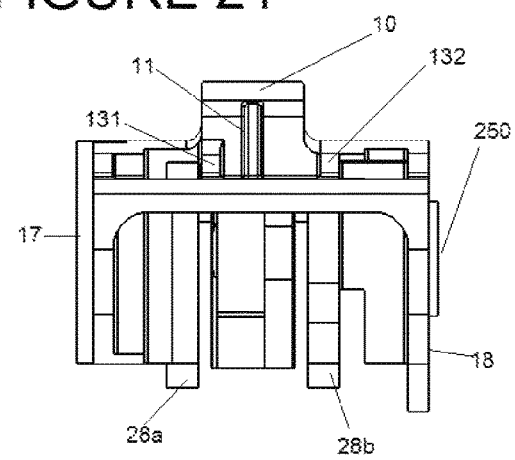
FIG. 21 illustrates back end view of the connector shown in FIG. 14.

The embodiment in FIGS. 14-21 is otherwise similar to the embodiment shown in FIGS. 1-14, and the descriptions set forth above are equally applicable to same. Additionally, FIG. 15 shows a perspective view of spacer projection 250 which can be adjusted in size and shape to properly adjust for a pin-and-locking-arm type wiper arm such that the locking tab of such an arm engages either a locking aperture 5, 6, 7, 8 or the opposite wall 17 of the connector 1.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the retaining pin apertures, locking apertures, or other mechanisms can vary so long as they are capable of performing their intended function.

We claim:

1. A windshield wiper connector for connecting a first or second type of wiper arm with a windshield wiper, the connector having a proximal end and a distal end longitudinally opposed to the proximal end, the connector also having a top side and an opposed bottom side, the connector comprising:
   two opposing peripheral side walls each having an outer surface;
   a top surface extending between the two opposing peripheral side walls at the top side of the connector;
   a first pin passage extending between the opposing peripheral side walls and including a plurality of first pin apertures, at least one first pin aperture provided in one of the peripheral side walls;
   a second pin passage extending between the opposing peripheral side walls and including a plurality of second pin apertures, at least one of the second pin apertures provided in one of the peripheral side walls;
   at least two internal support walls extending downward from the top surface and substantially along the longitudinal length of the connector; and
   a rivet passage and arcuate rivet clip in each of the internal support walls, the arcuate rivet clip open at the bottom side and closed at the top side by the top surface,
   wherein the top surface has a break between the opposing peripheral side walls at the first pin passage, the first pin passage and the at least one first pin aperture is thereby open at the top side.

2. The connector of claim 1 wherein the top surface of the connector further comprises a proximal shelf proximate the proximal end of the connector and a distal shelf proximate the distal end of the connector, wherein the first pin passage is positioned between the proximal and distal shelfs.

3. The connector of claim 2 wherein the proximal shelf of the connector is recessed away from the top side relative to the distal shelf.

4. The connector of claim 2 wherein the distal shelf is sloped.

5. The connector of claim 2 further comprising a tower projecting from the top surface towards the top side of the connector and proximate the first pin passage.

6. The connector of claim 5 wherein the tower comprising an extension projecting from the tower towards the proximal end of the connector.

7. The connector of claim 5 wherein the tower is provided between proximal shelf and the first pin passage.

8. The connector of claim 7 wherein a rivet passage is provided between the first pin passage and the second pin passage.

9. The connector of claim 2 further comprising a locking aperture running longitudinally along the proximal shelf.

10. The connector of claim 2 further comprising another locking aperture running longitudinally along the distal shelf.

11. The connector of claim 1 further comprising at least one rivet aperture in each of the at least two opposing peripheral side walls, the at least one rivet aperture aligned with the rivet passage.

12. The connector of claim 1 further comprising a second cantilever projecting from the top surface towards the bottom side of the connector into a portion of the second pin passage.

13. The connector of claim 1 wherein the first pin passage is shorter than the rivet passage, and the rivet passage is shorter than the second pin passage.

14. A wiper blade assembly connectable with a first or second type of wiper arm, the wiper blade assembly comprising:
   a wiper blade; and
   a connector having a proximal end and a distal end longitudinally opposed to the proximal end, the connector also having a top side and an opposed bottom side, the connector comprising:
      two opposing peripheral side walls each having an outer surface;
      a top surface extending between the two opposing peripheral side walls at the top side of the connector;
      a first pin passage extending between the opposing peripheral side walls and including a plurality of first pin apertures, at least one first pin aperture provided in one of the peripheral side walls;
      a second pin passage extending between the opposing peripheral side walls and including a plurality of second pin apertures, at least one of the second pin apertures provided in one of the peripheral side walls; and
      a first cantilever projecting from the top surface towards the bottom side of the connector into a portion of the first pin passage;
   wherein the top surface has a break between the opposing peripheral side walls at the first pin passage, the first pin passage and the at least one first pin aperture is thereby open at the top side.

15. A windshield wiper connector for connecting a first or second type of wiper arm with a windshield wiper, the connector having a proximal end and a distal end longitudinally opposed to the proximal end, the connector also having a top side and an opposed bottom side, the connector comprising:
   two opposing peripheral side walls each having an outer surface;
   a top surface extending between the two opposing peripheral side walls at the top side of the connector, the top surface including a distal shelf proximate the distal end and a proximal shelf proximate the proximal end;
   a first pin passage extending between the opposing peripheral side walls and provided between the distal shelf and the proximal shelf, the first pin passage including a plurality of first pin apertures, at least one first pin aperture provided in one of the peripheral side walls;
   a second pin passage extending between the opposing peripheral side walls and provided proximate the distal shelf, the second pin passage including a plurality of second pin apertures, at least one of the second pin apertures provided in one of the peripheral side walls; and
   a rivet passage extending between the opposing peripheral side walls and provided between the first and second pin passages, the rivet passage including an arcuate rivet clip,
   wherein the top surface has a break between the opposing peripheral side walls at the first pin passage, the first pin passage and the at least one first pin aperture is thereby open at the top side, and
   wherein the rivet passage is open at the bottom side.

16. The connector of claim 15 further comprising a pair of internal walls projecting from the top surfaces towards the bottom side of the connector,
   wherein each internal wall extends between the proximal and distal shelfs,
   wherein additional second pin apertures of the plurality of the second pin apertures are provided in the internal walls,
   wherein the arcuate rivet clip is provided in the internal walls, and
   wherein the internal walls are dimensioned to avoid entering the first pin passage.

17. The connector of claim 15 further comprising;
   a tower projecting from the top surface towards the top side of the connector, the tower provided between the first pin passage and the proximal shelf, the tower including an extension projecting from the tower towards the proximal end of the connector;
   a locking aperture running longitudinally along the proximal shelf; and
   another locking aperture running longitudinally along the distal shelf.

18. A windshield wiper connector for connecting a first or second type of wiper arm with a windshield wiper, the connector having a proximal end and a distal end longitudinally opposed to the proximal end, the connector also having a top side and an opposed bottom side, the connector comprising:
   two opposing peripheral side walls each having an outer surface;
   a top surface extending between the two opposing peripheral side walls at the top side of the connector, the top surface including a proximal a proximal shelf proximate the proximal end of the connector and a distal shelf proximate the distal end of the connector;
   at least two internal support walls extending downward from the top surface and substantially along the length of the connector;
   a rivet passage and arcuate rivet clip in each of the internal support walls, the arcuate rivet clip open at the bottom side and closed at the top side by the top surface;
   a first pin passage positioned between the proximal shelf and distal shelf and extending between the opposing peripheral side walls and including a plurality of first pin apertures, at least one first pin aperture provided in one of the peripheral side walls;
   a second pin passage extending between the opposing peripheral side walls and including a plurality of second pin apertures, at least one of the second pin apertures provided in one of the peripheral side walls; and
   a tower projecting from the top surface towards the top side of the connector and proximate the first pin passage, the tower including an extension projecting from the tower towards the proximal end of the connector,
   wherein the top surface has a break between the opposing peripheral side walls at the first pin passage, the first pin passage and the at least one first pin aperture is thereby open at the top side.

19. A wiper blade assembly connectable with a first or second type of wiper arm, the wiper blade assembly comprising:
   a wiper blade; and
   a windshield wiper connector having a proximal end and a distal end longitudinally opposed to the proximal end, the connector also having a top side and an opposed bottom side, the connector comprising:
two opposing peripheral side walls each having an outer surface;
a top surface extending between the two opposing peripheral side walls at the top side of the connector;
a first pin passage extending between the opposing peripheral side walls and including a plurality of first pin apertures, at least one first pin aperture provided in one of the peripheral side walls;
a second pin passage extending between the opposing peripheral side walls and including a plurality of second pin apertures, at least one of the second pin apertures provided in one of the peripheral side walls;
at least two internal support walls extending downward from the top surface and substantially along the longitudinal length of the connector; and
a rivet passage and arcuate rivet clip in each of the internal support walls, the arcuate rivet clip open at the bottom side and closed at the top side by the top surface,
wherein the top surface has a break between the opposing peripheral side walls at the first pin passage, the first pin passage and the at least one first pin aperture is thereby open at the top side.

20. A wiper blade assembly connectable with a first or second type of wiper arm, the wiper blade assembly comprising:
a wiper blade; and
a windshield wiper connector having a proximal end and a distal end longitudinally opposed to the proximal end, the connector also having a top side and an opposed bottom side, the connector comprising:
two opposing peripheral side walls each having an outer surface;
a top surface extending between the two opposing peripheral side walls at the top side of the connector, the top surface including a distal shelf proximate the distal end and a proximal shelf proximate the proximal end;
a first pin passage extending between the opposing peripheral side walls and provided between the distal shelf and the proximal shelf, the first pin passage including a plurality of first pin apertures, at least one first pin aperture provided in one of the peripheral side walls;
a second pin passage extending between the opposing peripheral side walls and provided proximate the distal shelf, the second pin passage including a plurality of second pin apertures, at least one of the second pin apertures provided in one of the peripheral side walls; and
a rivet passage extending between the opposing peripheral side walls and provided between the first and second pin passages, the rivet passage including an arcuate rivet clip,
wherein the top surface has a break between the opposing peripheral side walls at the first pin passage, the first pin passage and the at least one first pin aperture is thereby open at the top side, and
wherein the rivet passage is open at the bottom side.

21. A wiper blade assembly connectable with a first or second type of wiper arm, the wiper blade assembly comprising:
a wiper blade; and
a windshield wiper connector having a proximal end and a distal end longitudinally opposed to the proximal end, the connector also having a top side and an opposed bottom side, the connector comprising:
two opposing peripheral side walls each having an outer surface;
a top surface extending between the two opposing peripheral side walls at the top side of the connector, the top surface including a proximal a proximal shelf proximate the proximal end of the connector and a distal shelf proximate the distal end of the connector;
at least two internal support walls extending downward from the top surface and substantially along the length of the connector;
a rivet passage and arcuate rivet clip in each of the internal support walls, the arcuate rivet clip open at the bottom side and closed at the top side by the top surface;
a first pin passage positioned between the proximal shelf and distal shelf and extending between the opposing peripheral side walls and including a plurality of first pin apertures, at least one first pin aperture provided in one of the peripheral side walls;
a second pin passage extending between the opposing peripheral side walls and including a plurality of second pin apertures, at least one of the second pin apertures provided in one of the peripheral side walls; and
a tower projecting from the top surface towards the top side of the connector and proximate the first pin passage, the tower including an extension projecting from the tower towards the proximal end of the connector,
wherein the top surface has a break between the opposing peripheral side walls at the first pin passage, the first pin passage and the at least one first pin aperture is thereby open at the top side.

* * * * *